United States Patent [19]
Houlihan

[11] 3,867,381
[45] Feb. 18, 1975

[54] 2-MORPHOLINOMETHYLBENZOPHENONE
[75] Inventor: William J. Houlihan, Mountain Lakes, N.J.
[73] Assignee: Sandoz-Wander, Inc., Hanover, N.J.
[22] Filed: Aug. 14, 1972
[21] Appl. No.: 280,347

Related U.S. Application Data
[60] Division of Ser. No. 23,074, March 26, 1970, abandoned, which is a continuation-in-part of Ser. No. 877,455, Nov. 17, 1969, abandoned, which is a division of Ser. No. 581,152, Sept. 22, 1966, Pat. No. 3,497,508.

[52] U.S. Cl. .......................... 260/247.7 R, 424/248
[51] Int. Cl. ............................................ C07d 87/34
[58] Field of Search .............................. 260/247.7 K

[56]  References Cited
UNITED STATES PATENTS
3,497,508  2/1970  Houlihan ..................... 260/247.7 K FOREIGN PATENTS OR APPLICATIONS
1,549,342  12/1968  France .......................... 260/247.7 K

*Primary Examiner*—Lorraine A. Weinberger
*Assistant Examiner*—Richard D. Kelly
*Attorney, Agent, or Firm*—Gerald D. Sharkin; Robert S. Honor

[57]  ABSTRACT

Substituted methyl benzophenones, e.g., 2-morpholinomethylbenzophenones, are prepared by treating corresponding methylbenzophenones through a variety of steps involving preparation of intermediates, e.g., halomethyl dioxalones, and are useful as anti-inflammatory agents.

1 Claim, No Drawings

2-MORPHOLINOMETHYLBENZOPHENONE

This application is a division of U.S. patent application Ser. No. 23,074, filed Mar. 26, 1970 now abandoned, which in turn is a continuation-in-part of U.S. patent application Ser. No. 877,455, filed Nov. 17, 1969, now abandoned, which in turn is a division application of U.S. patent application Ser. No. 581,152, filed Sept. 22, 1966, which issued as U.S. Pat. No. 3,497,508, dated Feb. 24, 1970.

This invention relates to tertiaryaminomethyl substituted benzophenones. In particular, it relates to 2-morpholinomethylbenzophenones, their preparation, and intermediates used in their preparation.

The compounds of this invention may be represented by the formula

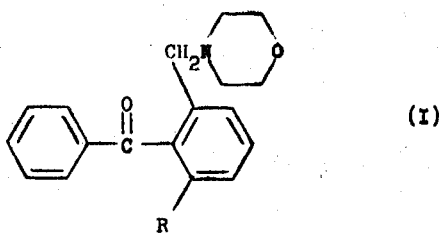

where

R represents hydrogen or chloro.

The compounds of formula (I) are prepared according to the following reaction scheme:

where

R is as set out above, and

X represents chloro or bromo, and

The compounds of formula (I) are prepared by reacting a methyl substituted benzophenone with ethylene glycol to form the corresponding 2-phenyl-2-tolyl-1,3-diox(ol) ane, converting the latter to the corresponding 2-phenyl-2-(halomethylphenyl)-1,3-diox(ol) ane and treating the latter with morpholine. This process is particularly suitable for the preparation of the compounds of formula (I) which have heretofore been extremely difficult to obtain by procedures disclosed in the prior art.

The reaction of the benzophenone of the formula (II) with ethylene glycol is conveniently carried out in an inert organic solvent, e.g., benzene, toluene, dichlorobenzene and hexane, and at room temperature or elevated temperatures up to reflux temperature. Preferably, the reaction is carried out at reflux temperature to facilitate continuous removal of water. To facilitate the formation of water, the reaction may be carried out in the presence of a catalytic amount of hydrogen ions such as by the use of a mineral acids, e.g., sulfuric acid, or organic acid, e.g., benzene sulfonic acid and p-toluene-sulfonic acid.

Conversion of the 1,3-diox(ol) ane (III) to the corresponding 1,3-diox(ol) ane (IV) is carried out by halide synthesis employing chlorine or bromine. The reaction is carried out at elevated temperatures, preferably reflux temperature, and is a suitable inert organic solvent. The reaction is desirably carried out in a solvent, such as carbon tetrachloride, and in the presence of sunlight or artificial sun source.

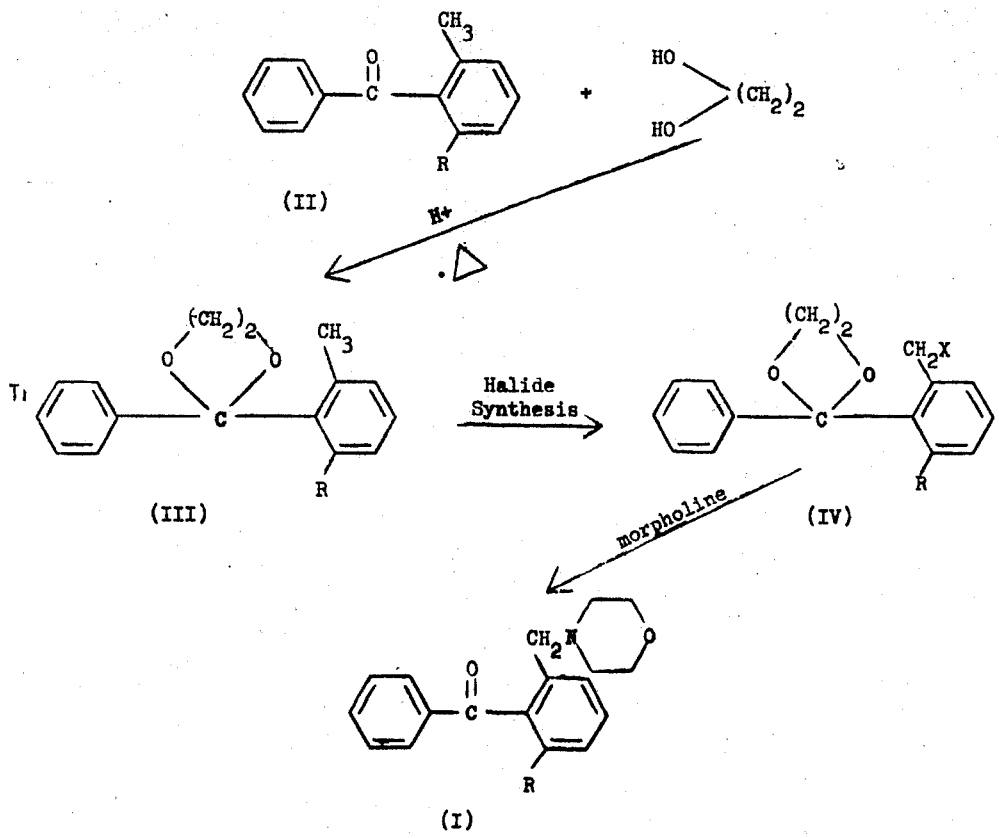

The reaction of 1,3-diox(ol) ane (IV) with morpholine is readily carried out in conventional manner at room temperature and by employing a suitable inert organic solvent, e.g., carbon tetrachloride, dichloromethane and hexane, as the reaction medium.

The methyl substituted benzophenones (II) employed above are known or can be prepared by methods disclosed in the literature for analagous compounds from known materials.

The compounds represented by structural formula (I) are useful because they possess pharmacological activity. In particular, the compounds are useful as antiinflammatory agents. For the above uses, the compounds may be combined with a conventional pharmaceutical carrier, and other adjuvants, if necessary, and administered orally in such forms as tablets, capsules, elixers, suspensions and solutions or parenterally in such forms as injectable solutions, suspensions and emulsions. Furthermore, the compounds may be similarly administered in the form of their non-toxic, pharmaceutically acceptable acid addition or quaternary salts. Such salts do not materially differ from the free base in their pharmacological effects, and are included within the scope of the invention. Representative of the acid addition salts are the mineral acid salts such as the hydrochloride, sulfate, and the like and the organic acid salts such as the acetate, maleate, p-toluenesulfonate, and the like. Exemplary of the quaternary salts are those derived from common quaternizing agents such as straight-chain lower alkyl halides, preferably containing from one to four carbon atoms, e.g. methyl bromide, ethyl bromide, methyl iodide and ethyl iodide, and straight-chain di-(lower) alkyl sulfates, e.g., dimethyl sulfate. Such salts are readily prepared from the free base by reacting the base with pharmacologically-acceptable acids or quaternizing agents in conventional manner.

For the above-mentioned use, the dosage administered will, of course, vary depending on the compound employed, mode of administration and treatment intented. However, in general, satisfactory results are obtained when administered at a daily dosage of from about 100 milligrams to about 800 milligrams, preferably given in divided doses throughout the day or in sustained release form.

A representative formulation of the present invention is a tablet prepared by conventional tabletting techniques containing the following ingredients:

| Ingredient | Parts by Weight |
|---|---|
| 2-morpholinomethylbenzophenone | 40 |
| Tragacanth | 2 |
| Lactose | 49.5 |
| Corn starch | 5 |
| Talcum | 3 |
| Magnesium stearate | 0.5 |

EXAMPLE I 2-morpholinomethylbenzophenone

Step A. Preparation of 2-phenyl-2-o-tolyl-1,3-dioxolane

To a flask equipped with a Dean-Stark tube is added 44.4 g. of 2-methylbenzophenone, 14.1 g. of ethylene glycol, 250 ml. of benzene and 0.5 g. of p-toluenesulfonic acid. The mixture is stirred and refluxed for 48 hours, and the solvent then removed on a rotary evaporater. The residue is crystallized from benzene-heptane to obtain 2-phenyl-2-o-tolyl-1,3-dioxalane, m.p. 73°–75°C.

Step B. Preparation of 2-phenyl-2-(o-bromomethylphenyl)-1,3-dioxolane.

To a flask equipped with a condenser, stirrer, dropping funnel and gas outlet tube is added 45 g. (0.188 mole) of 2-phenyl-2-o-tolyl-1,3-dioxolane, 21 g. (0.25 mole) of sodium bicarbonate and 280 ml. of carbon tetrachloride. The resulting mixture is stirred and irradiated with an artificial light source ("Sun Gun"), and then 10.8 ml. (0.22 mole) of bromide in 95 ml. of carbon tetrachloride is added dropwise. The mixture is refluxed until the color has faded and the refluxing continued for an additional 2 hours thereafter. The resulting mixture is filtered, and the solvent removed from the filtrate in vacuo on a rotary evaporater to obtain 2-phenyl-2-(o-bromoethylphenyl)-1,3-dioxolane.

Step C. Preparation of 2-morpholinomethylbenzophenone.

To a cooled solution of 35.4 g. of 2-phenyl-2-(o-bromoethylphenyl)-1,3-dioxolane 150 ml. of dichloromethane is added dropwise in a solution of 29.0 g. of morpholine in 150 ml. of dichloromethane. The mixture is stirred overnight at room temperature, then filtered and the dichloromethane layer extracted with 2N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporater to obtain 2-morpholinomethylbenzophenone. The base is dissolved in methanol, the resulting solution saturated with hydrogen chloride gas and then treated with anhydrous diethyl ether and then filtered to obtain 2-morpholinomethylbenzophenone hydrochloride, m.p. 180°–182°C. (after recrystallization from diethyl ether-ethyl acetate).

EXAMPLE II.

2-morpholinomethyl-6-chlorobenzophenone.

Step A. Preparation of-2-phenyl-2-(2-methyl-6-chlorophenyl)-1,3-dioxlane.

To a flask equipped with a Dean-Stark tube is added 44.4 g. of 2-methyl-6'-chlorobenzophenone, 14.1 g. of ethylene glycol, 250 ml. of benzene and 0.5 g. of p-toluenesulfonic acid. The mixture is stirred and refluxed for 48 hours, and the solvent then removed on a rotary evaporater to obtain 2-phenyl-2-(2-methyl-6-chlorophenyl)-1,3-dioxlane.

Step B. Preparation of 2-phenyl-2-(2-chloromethyl-6-chlorophenyl)-1,3-dioxolane.

To a flask equipped with a condenser, stirred, dropping funnel and gas outlet tube is added 27.5 g. of 2-phenyl-2-(2-methyl-6-chlorophenyl)-1,3-dioxolane, 11.6 g. of sodium bicarbonate and 150 ml. of carbon tertrachloride. The resulting mixture is stirred and irradiated with an artificial light source ("Sun Gun") and then 17.6 g. of chlorine in 60 ml. of carbon tetrachloride is added dropwise. The mixture is refluxed until the color has faded, and the refluxing continued for an additional two hours thereafter. The resulting mixture is filtered, and the solvent removed from the filtrate in vacuo on a rotary evaporater to obtain 2-phenyl-2-(2-chloromethyl-6-chlorophenyl)-1,3-dioxolane.

Step C. Preparation of 2-morpholinomethyl-6-chlorobenzophenone.

To a cooled solution of the product obtained in Step B. in 150 ml. of carbon tetrachloride is added dropwise a solution of 17.4 g. of morpholine in 70 ml. of carbon tetrachloride. The mixture is stirred overnight at room temperature, then filtered and the carbon tetrachloride layer extracted with 2N hydrochloric acid. The acidic extract is made basic by the addition of solid sodium carbonate and then extracted with chloroform. The chloroform layer is washed with water, dried over magnesium sulfate and filtered. The filtrate is concentrated on a rotary evaporater, and the residue dissolved in a mixture of 50 ml. of methanol, 5 ml. of water and 10 ml. of concentrated hydrochloric acid. The resulting solution is refluxed for two days, and the solvent then removed on a rotary evaporater. The residue is made basic with 2N sodium carbonate solution and extracted with chloroform. The chloroform extract is dried over sodium sulfate, filtered and concentrated in vacuo on a rotary evaporater to obtain 2-morpholinomethyl-6-chlorobenzophenone. (m.p. 108°–109°C., ethanol).

What is claimed is:

1. The compound which is 2-morpholinomethylbenzophenone.

* * * * *